United States Patent [19]

Zinn

[11] E Re. 29,965

[45] Reissued Apr. 17, 1979

[54] WALL CONSTRUCTION

[76] Inventor: Daniel L. Zinn, 2545 Beaufait, Detroit, Mich. 48207

[21] Appl. No.: 633,740

[22] Filed: Nov. 20, 1975

Related U.S. Patent Documents

Reissue of:

[64] Patent No.: 3,841,043
Issued: Oct. 15, 1974
Appl. No.: 382,604
Filed: Jul. 25, 1973

U.S. Applications:

[62] Division of Ser. No. 257,943, May 30, 1972, abandoned, which is a division of Ser. No. 74,022, Sep. 21, 1970, abandoned.

[51] Int. Cl.[2] ..... E04B 1/74

[52] U.S. Cl. ..... 52/243; 52/346; 52/481

[58] Field of Search ..... 52/243, 732, 346, 743, 52/347, 747, 356, 741, 359, 730, 481, 729, 714, 720, 100, 364, 241, 738, 242; 181/33 A, 33 G, 33 GA, 33 GC, 33 K

[56] References Cited

U.S. PATENT DOCUMENTS

| | | | |
|---|---|---|---|
| 1,826,114 | 10/1931 | Young | 52/615 |
| 1,963,416 | 6/1934 | Minshall | 52/720 |
| 2,056,328 | 10/1936 | Price | 52/243 |
| 3,058,551 | 10/1962 | Martin | 52/393 |
| 3,177,620 | 4/1965 | Brown et al. | 52/347 X |
| 3,238,677 | 3/1966 | Soubier | 52/599 X |
| 3,271,920 | 9/1966 | Downing, Jr. | 52/481 X |
| 3,324,615 | 6/1967 | Zinn | 52/346 X |
| 3,333,390 | 8/1967 | Banning | 52/481 X |
| 3,370,391 | 2/1968 | Dupuis et al. | 52/346 |
| 3,525,189 | 8/1970 | Nelsson | 52/378 |
| 3,609,933 | 10/1971 | Jahn et al. | 52/481 X |
| 3,921,346 | 11/1975 | Sauer et al. | 52/236 X |

*Primary Examiner*—Leslie Braun
*Attorney, Agent, or Firm*—Cullen, Sloman, Cantor, Grauer, Scott & Rutherford

[57] ABSTRACT

A sound attenuating wall employing studs and panels, wherein the studs mounted in a line have alternately reversed flanges of greater and lesser resiliency, and the panels have their edges at and fixed to the less resilient flanges and their centers at the more resilient flanges.

5 Claims, 8 Drawing Figures

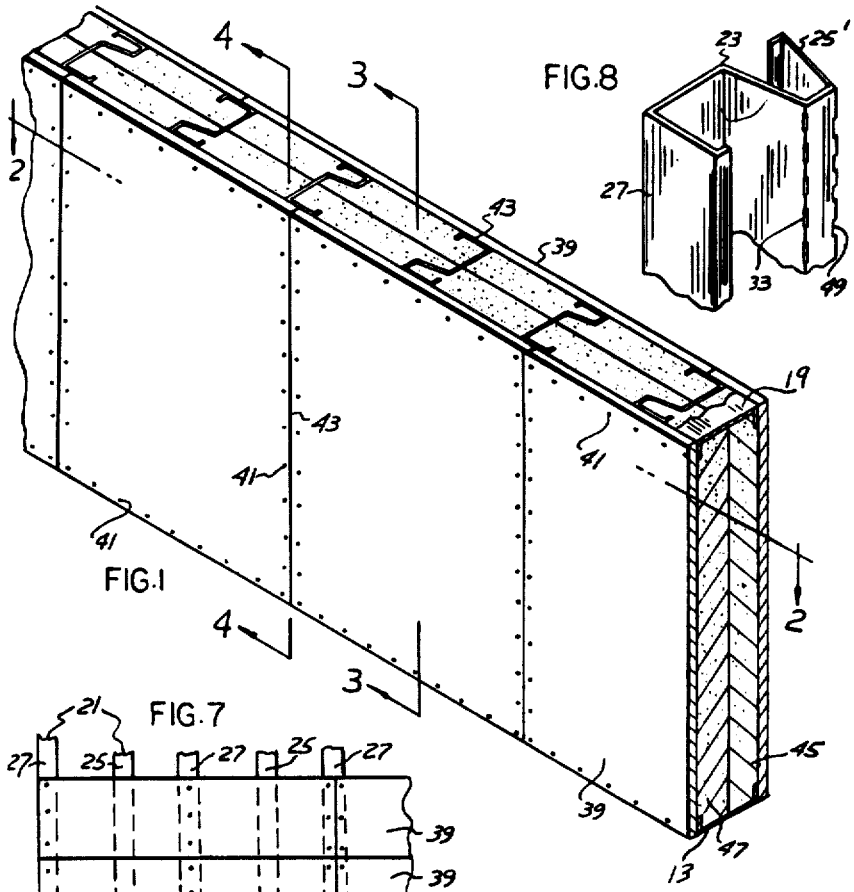
FIG.1
FIG.8
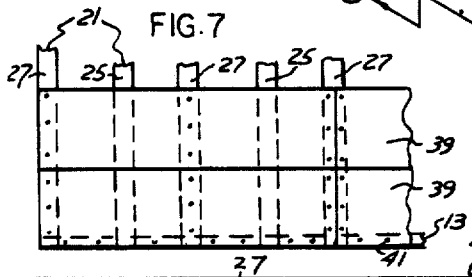
FIG.7
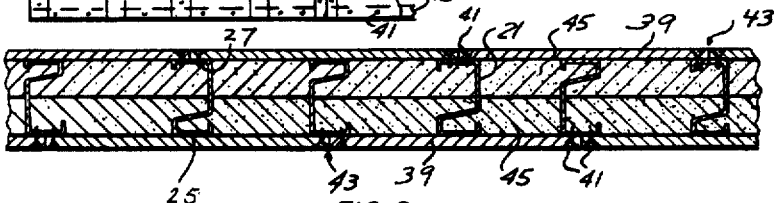
FIG.2

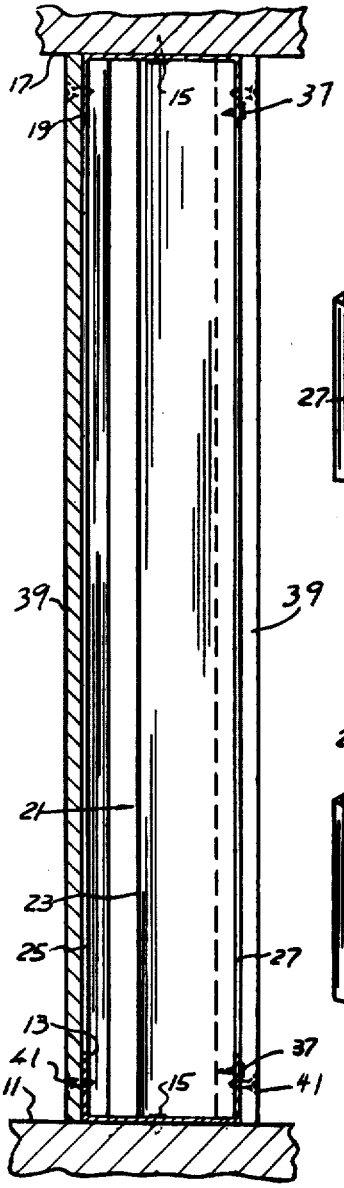
FIG 3
FIG. 5
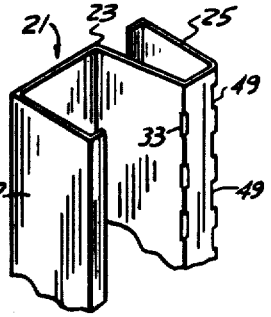
FIG. 6
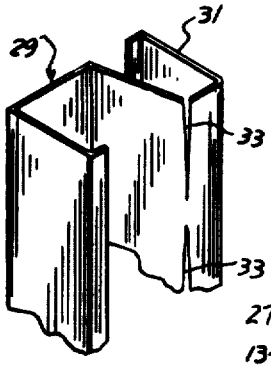
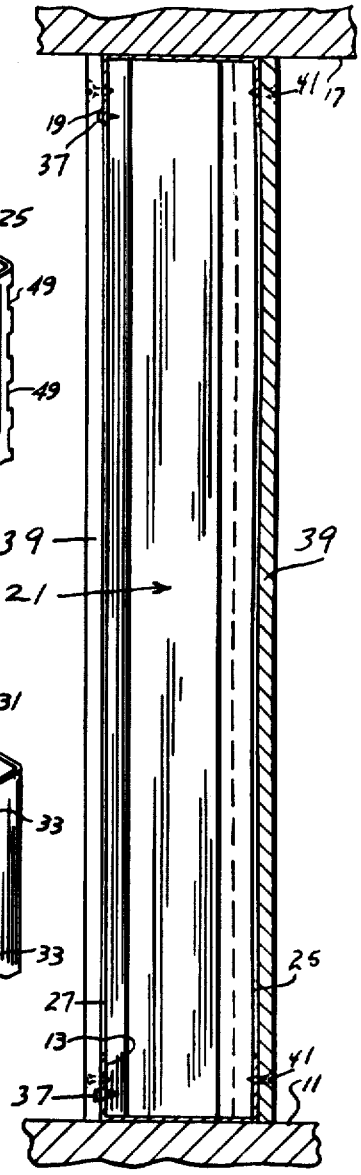
FIG. 4

WALL CONSTRUCTION

Matter enclosed in heavy brackets [ ] appears in the original patent but forms no part of this reissue specification; matter printed in italics indicates the additions made by reissue.

CROSS REFERENCE

This application is a divisional of my copending application Ser. No. 257,943 of May 30, 1972, now abandoned, which was a division of and copending with application Ser. No. 74,022, of Sept. 21, 1970, now abandoned.

In the wall of the invention, double side or double flange studs are mounted in a line, with each mounted stud having one side or flange of greater resilience than the other. The studs are alternately reversed so that on each side of the line of studs, the less resilient flanges are alternated with the more resilient flanges. In each adjacent pair of studs, on a single wall side, one flange is of greater resilience than the other.

When a panel is mounted to span at least three studs, the panel edges are at and fixed to the less resilient flanges of the two outer studs of such three studs; and the panel centers or inner portions are adjacent the more resilient flange of the central stud of such three studs.

THE PREFERRED EMBODIMENTS

Preferred embodiments are shown in the appended drawings, to be understood on reference to this specification.

IN THESE DRAWINGS

FIG. 1 is a fragmentary perspective view of a portion of the present sound attenuation wall.

FIG. 2 is a fragmentary section taken in the direction of arrows 2—2 of FIG. 1.

FIG. 3 is a fragmentary section taken in the direction of arrows 3—3 of FIG. 1.

FIG. 4 is a fragmentary section taken in the direction of arrows 4—4 of FIG. 1.

FIG. 5 is a fragmentary perspective view of the present improved stud construction.

FIG. 6 is a similar view of a modification.

FIG. 7 is a fragmentary elevational view with the partitions extending longitudinally.

FIG. 8 is similar to FIG. 5 showing a modified stud.

DETAILED DESCRIPTION OF THE EMBODIMENTS SHOWN IN THE DRAWINGS

A sound attenuation wall is shown in FIG. 1, and as indicated in FIGS. 3 and 4 is adapted for use between fixed structures such as a building floor 11 and ceiling 17.

Channels 13 and 19 are mounted upon said floor and ceiling and are secured by fasteners 15.

THE STUDS

A line or series of longitudinally spaced studs 21 is interposed between and projects into channels 13 and 19 and is suitably anchored thereto with each stud, as formed and mounted, having a first more resilient side 25 and a second less resilient side 27, and a web 23.

Studs 21 as best shown in FIG. 2 are alternately arranged so that the first and second flanges 25–27 of adjacent studs are alternately reversed.

The second, less resilient flanges 27 of the studs are anchored to the channels as by fasteners 37. The first or more resilient flanges 25 are not anchored to the channels.

THE PANELS

Wallboard panels 39 applied to opposite sides of the respective studs with the wallboards on each side being in alignment and in engagement with each other at their edges throughout the length of the wall such as is shown fragmentarily in FIG. 1 and in FIG. 2.

Wallboards on each side are in engagement along the registry line 43, FIG. 1 which corresponds to the central portion of the particular second flange 27 to which the wallboards at the respective edges are fixed by fasteners 41.

Each wallboard spans at least three studs with the outer edges of each wallboard fixed to the corresponding second flange 27 of the outer of said three studs as by a series of fasteners 41. In the modification shown in FIG. 7, the wallboards extend longitudinally and span more than three studs.

The central or inner portion of each wallboard 39 throughout its height is adjacent the corresponding resilient first flange 25. In FIG. 7, central portions of the wallboards loosely bear against adjacent resilient first flanges.

It is noted particularly with respect to FIGS. 1 and 2 that the wallboards 39 upon opposite sides of the partition at their respective meeting edges 43 are staggered or offset. Thus the meeting line 43 between a pair of wallboards on one side of the wall is in registry with corresponding central or intermediate portion of an opposed wallboard. The wallboards upon opposite sides of the wall are staggered whereby the wallboard on one side of the wall spans three adjacent studs and the opposing but staggered wallboard on the opposite side of the partition spans two of the said three studs.

By this construction the outer upright edges of each wallboard are fixedly secured to the second flange 27 of the corresponding stud whereas the upright central portion of each wallboard yieldingly bears against the corresponding resilient first flange 25 of the intermediate stud.

Thus, the individual wallboards affixed at their upright edges yieldably bear against the respective central stud and are adapted to flex inwardly and outwardly in the functioning of the present sound attenuation panel. The wallboards along their top and bottom edges are fixedly secured to the floor and ceiling channels by fasteners 41. Likewise in FIG. 7, the longitudinal edge of some wallboards bears against and is affixed to channels 13 or 19.

Suitable sound absorbing pads or blankets 45, of which a pair are shown, FIGS. 1 and 2, are interposed in compression between the assembled opposed wallboards 39 and have a very definite function in the final operation of the present sound attenuating panel. While the present panel as constructed is effective as a sound attenuation panel even without the sound absorbing pads interposed, an improved sound attenuation panel is provided when said pads are provided.

It has been found in operation that any inward flexing of the corresponding wallboards due to the transmission of sound vibrations therethrough causes a frictional rubbing action of the wallboard with respect to the sound absorbing pad. This rubbing action transforms sound energy to heat, thus, dissipating the sound and provides an improved sound attentuation wall partition. The compressed pads also dampen vibrations.

Glass fiber strips are shown in the illustrative embodiment, nine feet long for example, and thus extend between the floor and ceiling and are interposed in compression between the wallboards when assembled.

The resilient backing of each wallboard throughout its height is achieved by the yieldable first flanges 25 providing a yielding relationship between the wallboard and the supporting stud.

REPRISE

The broader aspect of this invention is that the studs when formed and mounted, have first and second flanges of different resiliency. One method of accomplishing this result is to secure only one flange of a stud to the channels. Thus the stud as mounted, provides the desired result.

Alternately, the stud as formed but prior to mounting may have flanges of different resiliency (in which case anchoring only one flange to the channels is optional).

One such stud 29 is fragmentarily shown in FIG. 6. The corresponding resilient first flange 31 is provided additional resiliency by a series of aligned spaced slits 33 formed in the stud web.

In FIG. 5 the resilient first flange 25 is given additional flexibility by the use of more slits. Longitudinally spaced slits 33 correspond to those of FIG. 6. Further longitudinally spaced slits 49 are formed at the one longitudinal edge of flange 25. Slits 49 are alternately arranged and staggered with respect to slits 33.

FIG. 8 is yet another modification of the stud in that the resilient first flange 25' is initially before assembly non-parallel to second flange 27. Flange 25' extends outwardly at an acute angle to flange 27 in the range of 5°-20° for illustration.

Upon assembly of the wallboards such as in FIGS. 1 and 2, the resilient first flanges 25' shown in FIG. 8 are then in compression and substantially parallel to flanges 25. Resilient first flange 25' has been rendered more flexible and resilient due to the double series of staggered slots 33 and 49.

*My Prior Patent 3,611,653*

*This co-pending issued patent 3,611,653, hereinafter referred to to as the "tabbed stud patent" since it discloses a "tabbed stud" is referenced here so that it may be contrasted, on the record, with the instant patent hereinafter referred to as the "tabless stud patent" since it discloses a "tabless stud".*

*In the "tabbed stud" construction, the two flanges of a stud are anchored and of equal resilience, with one flange, however, having integral struck-out tabs 31. These tabs are intended to provide the bearing surface, which is thus made up of isolated, separated, small projections, bound to be a variety of heights, thus, providing an irregular bearing surface. Since some, at least, of the tabs 31 can and may and probably would become twisted and deformed between the point and time of manufacture and the point and time of use, such tabs could puncture and damage the formed wall surface and panels.*

*The tabless studs hereof will present no such problems, since they are shown in the drawings as free of tabs or protuberances.*

CONCLUSION

While presently preferred embodiments of the invention have been disclosed supra, the inventive concepts hereof are not limited to such preferred embodiments but are those defined in the claims which follow.

I claim:

1. In a sound attenuating wall between parallel fixed structures of a building, the improvements comprising:

a series of formed elongated spaced building wall studs of the web and double flange type between and anchored at their ends to said building structures, with each stud when formed and anchored in line having a more resilient flange and a less resilient flange;

with the studs being arranged in reversed alternation so that the more resilient flanges of spaced adjacent studs face in opposite directions and equally the less resilient flanges of spaced adjacent studs face in opposite directions;

in combination with wall panels on one side of the line of studs arranged so that edge portions are adjacent each other and adjacent the less resilient flanges of such side and are affixed to such less resilient flanges;

and central portions of such panels are adjacent the more resilient flanges of such one side *and bear against these flanges, with each of such more resilient flanges being substantially smooth and substantially free of external protuberances; so that substantially the entire area of each such more resilient flange provides a resilient, overall, bearing area for the adjacent central portion of a panel.*

2. In a sound attenuating wall between parallel fixed structures of a building, the improvements comprising:

a series of formed elongated spaced building wall studs of the web and double flange type between and anchored at their ends to said building structures, with each stud when formed and anchored in line having a more resilient flange and a less resilient flange;

with the studs being arranged in reversed alternation so that the more resilient flanges of spaced adjacent studs face in opposite directions and equally the less resilient flanges of spaced adjacent studs face in opposite directions;

with the studs being so formed and mounted that in the mounted line of studs there are flanges which have greater resiliency and flanges which have lesser resiliency;

in combination with wall panels on one side of the line of studs offset with respect to wall panels on the opposite side so that central portions on one side are opposite edges of the opposing panels;

and the edges of panels on one side are opposite central portions of panels on the other side;

with the edges of the panels on one side being affixed to the less resilient flanges on such side;

and with the central portions of the panels on one side being adjacent the more resilient flanges on such side *and bear against these flanges, with each of such more resilient flanges being substantially smooth and substantially free of external protuberances; so that substantially the entire area of each such more resilient flange provides a resilient, overall, bearing area for the adjacent central portion of a panel.*

[3. A wall construction according to claim 2, wherein the flanges as formed are initially equal in resiliency, with the studs being so anchored that these flanges retain substantially their original resiliency without substantial impairment.]

4. A wall construction according to claim 2, wherein the flanges are initially [equal] *unequal* in resiliency with the ends of the more resilient flanges being so free of the fixed structures as to retain substantially their original resilience without substantial impairment, whereas the less resilient flanges are so anchored at their ends to the fixed structures so as to lose substantial portions of their original resilience.

5. A wall construction according to claim 2, wherein the greater resilience flanges are initially formed to be of greater resilience than the less resilient flanges, and are free of the fixed structures so as to retain their resilience without substantial impairment when the studs are anchored by anchoring the ends of the less resilient flanges to such fixed structure.

*6. In a sound attenuating wall between parallel fixed structures of a building, the improvements comprising:*

*a series of formed elongated spaced building wall studs of the web and double flange type between and anchored at their ends to said building structures, with each stud when formed and anchored in line having a more resilient bearing flange and a less resilient mounting flange;*

*said bearing flange and said mounting flange being substantially parallel and aligned on opposite sides of said web, said web including first and second legs interconnected by a transverse member, said transverse member being nonparallel relative to said bearing flange and said mounting flange;*

*each bearing flange and its juncture with the web being so formed that the entire bearing flange will deflect a greater amount, from the web-flange juncture to the free end of the flange, than the deflection of the mounting flange from its web-flange juncture to its free end under the same loading at the same distance from the respective web-flange junctures;*

*said mounting flange providing a stiffer, less resilient mounting for the adjacent edges of a pair of panels so that when the panels are fastened to a mounting flange the panels are retained firmly and snugly against the mounting flange in a manner to avoid deflection inwardly or outwardly from the plane of such panels;*

*said bearing flange providing a more resilient bearing for the center of a panel having its edges fastened to a pair of mounting flanges, so that the center of the panel and the bearing flange flex inwardly resiliently for sound attenuation, but with the center of the panel being free of outward bias from the bearing flange, which bearing flange is formed to be free of a tendency to deflect outwardly, though it is resilient enough to be flexed inwardly by outward sound waves impinging against the panel, said bearing flange and said mounting flange each being substantially smooth and substantially free of internal and external protuberances between its edges; so that substantially the entire area of each such bearing flange provides a resilient overall bearing area for the adjacent central part of a panel;*

*with the studs being arranged in reversed alternation so that the more resilient flanges of spaced adjacent studs face in opposite directions and equally the less resilient flanges of spaced adjacent studs face in opposite directions;*

*in combination with wall panels on one side of the line of studs arranged so that edge portions are adjacent each other and adjacent the less resilient flanges of such side and are affixed to such less resilient flanges;*

*and central portions of such panels are adjacent the more resilient flanges of such one side and bear against these flanges, with each of such more resilient flanges being substantially smooth and substantially free of external protuberances; so that substantially the entire area of each such more resilient flange provides a resilient, overall, bearing area for the adjacent central portion of a panel.*

* * * * *